United States Patent
Meyer, Jr. et al.

[19]

[11] Patent Number: 5,892,361
[45] Date of Patent: Apr. 6, 1999

[54] USE OF RAW AMPLITUDE AND PHASE IN PROPAGATION RESISTIVITY MEASUREMENTS TO MEASURE BOREHOLE ENVIRONMENTAL PARAMETERS

[75] Inventors: Wallace Harold Meyer, Jr., Spring; Larry Wayne Thompson, Willis; Macmillan M. Wisler, Kingwood; Jian-Quan Wu, Houston, all of Tex.

[73] Assignee: Baker Hughes Incorporated, Houston, Tex.

[21] Appl. No.: 674,621

[22] Filed: Jul. 3, 1996

Related U.S. Application Data

[63] Continuation of Ser. No. 212,269, Mar. 14, 1994, abandoned.

[51] Int. Cl.$^6$ .................. G01L 3/18; G01L 3/28
[52] U.S. Cl. ............................................. 324/338
[58] Field of Search ................. 324/323, 338–346; 73/152; 364/422

[56] References Cited

U.S. PATENT DOCUMENTS

| | | | |
|---|---|---|---|
| 3,891,916 | 6/1975 | Meador . | |
| 4,216,536 | 8/1980 | More | 367/83 |
| 4,308,499 | 12/1981 | Thierbach et al. | 324/338 |
| 4,703,277 | 10/1987 | Kenyon et al. | 324/323 |
| 4,720,681 | 1/1988 | Sinclair et al. | 324/339 |
| 4,730,161 | 3/1988 | Cox, et al. . | |
| 4,780,679 | 10/1988 | Kenyon et al. | 324/341 |
| 4,786,873 | 11/1988 | Sherman | 324/323 |
| 4,873,488 | 10/1989 | Barber et al. . | |
| 4,899,112 | 2/1990 | Clark et al. . | |
| 4,968,940 | 11/1990 | Clark et al. | 324/338 |
| 5,065,099 | 11/1991 | Sinclair et al. | 324/339 |
| 5,081,419 | 1/1992 | Meador et al. | 324/338 |
| 5,089,989 | 2/1992 | Schmidt et al. | 367/35 |
| 5,144,245 | 9/1992 | Wisler . | |
| 5,157,331 | 10/1992 | Smith | 324/338 |
| 5,157,605 | 10/1992 | Chandler et al. . | |
| 5,187,661 | 2/1993 | Sinclair . | |
| 5,210,495 | 5/1993 | Hapashy et al. . | |
| 5,278,507 | 1/1994 | Bartel et al. . | |
| 5,345,179 | 9/1994 | Habashy et al. . | |

FOREIGN PATENT DOCUMENTS

WO8401439 4/1984 WIPO .

OTHER PUBLICATIONS

"Measurement of Dielectric Response of Water Saturated Rocks", Taherian Kenyon & Safinya, 55 *Geophysics* 12 (Dec. 1990) pp. 1530–1541, 6 Figs, 2 Tables.

"Inversion of 2Mhz Propagation Resistivity Logs" W. H. Meyer, Teleco Oilfield Service, Inc. SPWCA $33_{rd}$ Annual Logging Sympasium, (Jun. 14–17, 1992).

"Effect of Arbitrarily Shaped Boreholes and Invasion of Propagation Resistivity Measurements in Drilling Horizontal Wells", J–Q. Wu, et al., *progress in Electromagnetic Research Symposium*, Pasadena, Ca, (Jul. 14, 1993).

"Effects of Eccentering MWD Tools on Electromagnetic Resisitivity Measurements", J–Q. WU, et al., *Society of Professional Well Log Analysis*, $31_{st}$ Annual Logging Symposium, (Jun. 24–27, 1990).

*Primary Examiner*—Walter E. Snow
*Attorney, Agent, or Firm*—Madan & Morris, PLLC

[57] ABSTRACT

A propagation resistivity measurement-while-drilling device is used to measure borehole environmental parameters along with electromagnetic properties of the formation. Multiple transmitter-receiver pairs operating at one or more transmitter frequencies are used to obtain a set of amplitude and phase measurements. A model of the response of the borehole instrument in varying formation and borehole conditions is also utilized. Formation and borehole parameters of interest are selected by the analyst. The measured amplitude and phase data set is then combined with the model of the tool response to obtain the selected parameters of interest.

33 Claims, 4 Drawing Sheets

USE OF RAW AMPLITUDE AND PHASE IN PROPAGATION RESISTIVITY MEASUREMENTS TO MEASURE BOREHOLE ENVIRONMENTAL PARAMETERS

This is a continuation of application Ser. No. 08/212,269 filed on Mar. 14, 1994, now abandoned.

BACKGROUND OF THE INVENTION

This invention relates to the measurement of geophysical parameters of earth formations penetrated by a borehole and more particularly to propagation resistivity measurements at multiple transmitter frequencies and multiple transmitter receiver spacing. In addition the invention is directed toward the measurement of physical parameters of the borehole in addition to resistivity properties of the formation penetrated by the borehole. Measurements are made using an array of four transmitters and two receivers. Elements of the transmitter receiver array are longitudinally and symmetrically spaced along an elongated borehole instrument. Each transmitter induces an alternating voltage into the borehole and the earth formation in the vicinity of the borehole. The amplitudes and phase shifts of the signals produced by these induced alternating electromagnetic fields are measured by the receivers. These signals are effected by numerous formation, near borehole and borehole parameters. The measurements are combined to yield resistivity of the formation, parameters relating to the invasion of drilling fluids into the formation in the near borehole region, and physical characteristics of the borehole itself. The invention is directed toward, but not limited to, measurement while drilling (MWD) applications.

Multiple transmitter and receiver arrays have been employed in prior borehole induction measurements. The primary parameters of interest is the resistivity of the virgin or uninvaded formation from which the hydrocarbon saturation of the formation is determined. Symmetric pairs of transmitters and receivers have been employed to minimize or "cancel" the effects on the resistivity measurements of rapidly changing borehole parameters such as borehole diameter, eccentricity and rugosity. U.S. Pat. No. 4,899,112 to Brian Clark et al teaches a well logging technique in which electromagnetic propagation waves are used to measure formation resistivity at different radial depths of investigation. In addition, the cited patent teaches methods for determining the existence, location and properties of beds and caves, and also teaches a method for determining changes in the size of the borehole. The measurements are based upon the observation that phase and amplitude apparent resistivity measurements, made at a given transmitter frequency and a given transmitter-receiver spacing, exhibit different depths of investigation. The teachings of Clark do not provide a method for the user to select from a "menu" the parameters of interest as does the present invention. There are other advantages of the present invention that will be emphasized in the following discussions. Multiple transmitter-receiver spacing have also been employed in the prior art to obtain measurements into the formation of varying radial depths of investigation. Combining such measurements tends to minimize borehole effects as well as yield information concerning the radial extent of the invasion of drilling fluid into the virgin formation. Invasion measurements can be related to the permeability of the formation which, in turn, is related to the producibility of fluids contained within the formation rock matrix. Again, no attempts have been made in the prior art to obtain quantitative measures of physical characteristics of the borehole in conjunction with measures of electromagnetic properties of the formation. Multiple transmitter frequencies have also been applied in the prior art to enhance and separate electromagnetic properties of the formation such as resistivity and dielectric constant, obtaining varying effecting radial depths of investigation and to a lesser extent to minimize borehole effects. Once again, contributions from the borehole effects have not been quantified and related to the physical condition of the borehole.

SUMMARY OF THE INVENTION

The invention is directed toward the simultaneous measurement of electromagnetic parameters of earth formations penetrated by a borehole, the invasion profile of fluids into the formation during the drilling operation, and the physical characteristics of the borehole. Electromagnetic properties of the formation such as resistivity are used to determine hydrocarbon saturation in the presence of saline, connate waters. The drilling fluid invasion profile is indicative of the permeability of the formation. A measure of these parameters while the formation is being penetrated by the drill bit results in a more efficient drilling program in that it is not necessary to interrupt the drilling operation, retrieve the drill bit from the borehole, and run intermediate wireline logs to determine if the target formation has been reached. Finally the physical properties of the borehole such as rugosity and ellipticity can be related to the mechanical properties of the rock matrix and to the effectiveness of the drilling operation. A knowledge of rock matrix properties is extremely useful in specifying subsequent completion activities such as possible fracturing and even perforating programs. Knowing the condition of the borehole while drilling, the drilling program can often be modified to increase efficiency such as modifying drilling parameters to increase bit penetration rates.

The borehole instrument portion of the invention comprises an elongated mandrel such as a drill collar and a measurement-while-drill (MWD) embodiment. Two receivers comprising coils of one or more turns are wrapped around the outside diameter of the drill collar and spaced longitudinally along the center of the drill collar. Four transmitters comprising coils of one or more turns are wrapped around the outside diameter of the drill collar and are spaced symmetrically and on either side of the midpoint between the two receiver coils. All transmitter and receiver coils are electrically insulated from the metallic drill collar. Transmitters are activated sequentially at a first frequency. The phase and amplitude of the induced electromagnetic signals within the receivers are measured yielding two measurements of amplitude and two measurements of phase shift for each transmitter activation for a total of sixteen (16) measurements. The procedure is then repeated at a second transmitter frequency yielding an additional two measurements of amplitudes and two measurements of phase shift for each transmitter activation for an additional total of sixteen measurements. An apparent resistivity measurement is calculated from each of these thirty two uncorrected "raw" measurements. Each apparent resistivity calculation, being uncorrected as previously mentioned, is greatly affected by the borehole and the near borehole environs. These raw measurements and corresponding apparent resistivity calculations are used, therefore, to determine borehole characteristics such as borehole diameter, rugosity and eccentricity as well as for correcting apparent resistivity measurements for these borehole effects. Stated another way the invention not only provides formation resistivity measurements corrected for perturbing effects of the borehole, but also provides a method for quantifying these corrections thereby providing useful information on the physical properties of the well bore. These well bore properties, in turn, can be related to such parameters as mechanical properties of the rock matrix, shallow invasion profiles, and the effectiveness of the drilling program. The vertical resolution of the sixteen apparent resistivity measurements are, in general, different and vary from measurement to measurement when borehole conditions are rapidly varying. It is necessary to apply deconvolution techniques in order to "match" the vertical resolution of all sixteen measurements prior to combining these data using the method previously mentioned. Resolution matching is not an independent data processing step as is often the case in prior art, but is an integral step in the calculation of all parameters of interest.

It should be understood that other transmitter-receiver-operating frequency combinations can be utilized. As an example, two transmitters and four receivers with the transmitters operating at two frequencies will also yield thirty two raw measurements. Expanding the variability concept even further, an array of one receiver operating at one frequency and sixteen receivers will also yield thirty two raw measurements of amplitude and phase as will one receiver and one transmitter operating at eight frequencies. The transmitter-receiver frequency combination can also be varied to yield a raw measurement total greater than or less than thirty-two with a corresponding increase or decrease in the number of parameters of interest that can be uniquely determined.

BRIEF DESCRIPTION OF THE DRAWINGS

So that the manner in which the above recited features, advantages and objects of the present invention are obtained and can be understood in detail, more particular description of the invention, briefly as summarized above, may be had by reference to the embodiments thereof which are illustrated in the appended drawings. It is to be noted, however, that the appended drawings illustrate only typical embodiments of the invention and are therefore not to be considered limiting of its scope for the invention may admit to other equally effective embodiments.

DETAILED DESCRIPTION OF THE PREFERRED EMBODIMENT

Figure 1:
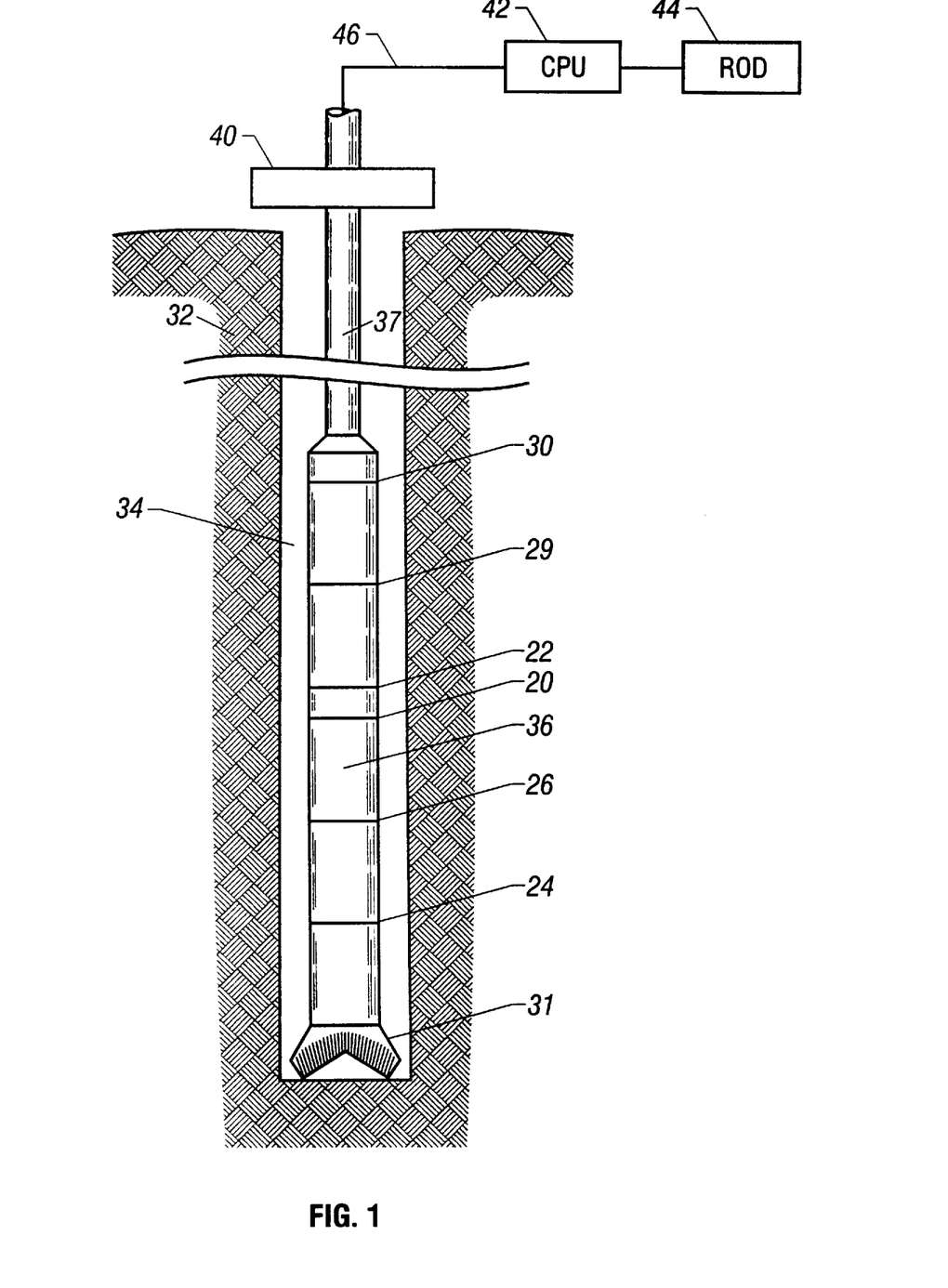
FIG. 1 illustrates the invention in an MWD embodiment.

The invention employed in an MWD environment is illustrated in a very general manner in FIG. 1. The drill bit 31 is attached to a metallic drill collar 36 which in turn is mounted on the well bore drill string 37. This assembly is shown suspended in a well bore 34 which penetrates the earth formation 32. An apparatus of rotating the drill string 37 is identified by the numeral 40. Four transmitter coils of one or more turns are identified by the numerals 26, 24, 29 and 30 and known in the art as "loop antennas". The axes of these coils are coincident with the axis of the drill collar 36. The coils are electrically insulated from and slightly recessed within the outer diameter of the drill collar thereby comprising an integral element of the drill collar assembly. Two receiver coils are identified by the numerals 20 and 22. The geometries of these coils are quite similar to the geometries of the transmitter coils and again comprise integral elements of the collar assembly 36. Power sources 41 and control circuitry 48 for the transmitters and receivers are internal to the drill collar 36. Data recorded by the receivers can either be transmitted in real time to the surface using the data transmission system 45 or can be recorded by recorder 48 in memory 47 for later retrieval. For real time data transmission embodiment signals from the receivers are transmitted to the surface via a path generically noted by the numeral 46, transferred to a CPU 42 for processing and correlating the depths from the drill collar depth indicator (not shown), with these results being transferred to a recorder 44 which displays the computed parameters of interest as a function of depth at which the input measurements were made. An alternate embodiment comprises a processor unit (not shown) mounted within the drill collar 36 to perform data processing downhole. Memory capacity is usually limited in MWD borehole devices. In order to most effectively utilize the limited memory, it is often desirable to process raw data downhole and store the processed data rather than store the more voluminous raw data.

Figure 2:
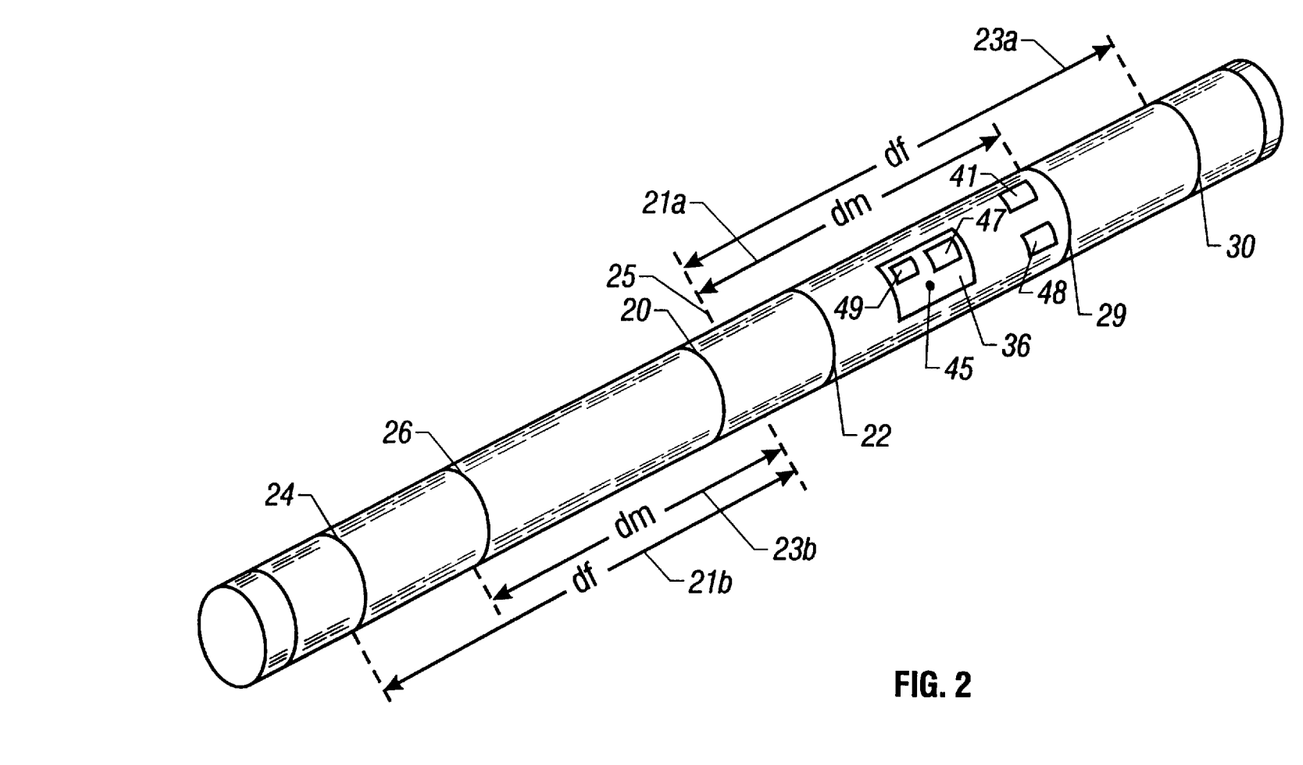
FIG. 2 shows a more detailed view of the transmitter and receiver coil arrays mounted on a drill collar.

An enlarged view of the drill collar and transmitter receiver array is shown in FIG. 2. The two receivers are denoted by the numerals 20 and 22. Transmitters 26 and 24 are longitudinally spaced distances 23b and 21b, respectively, from the midpoint 25 between receivers 20 and 22. Transmitters 29 and 30 are likewise longitudinally spaced distances 21a and 23a respectively from the midpoint 25. In the preferred embodiment, the distances 21a and 21b are equal; similarly, the distances 23a and 23b are also equal. Again, power sources and control circuitry for the transmitters and receivers which are internal to the drill collar are not shown. The symmetrical spacing pattern of transmitters and receivers about the midpoint 25 between receivers 20 and 22 is preferred but not a necessary condition for the embodiment of the invention. The transmitters 24, 26, 29 and 30 are activated sequentially at a given frequency $\omega_1$. The phase and amplitude of the induced electromagnetic signal are measured at each receiver, trasmitter pair thereby yielding a total of eight measurements of amplitudes and eight measurements of phase shift which will be identified as $A_i$ and $P_i$, respectively, where i=(1, . . . , 8). The procedure is then repeated at a second transmitter frequency $\omega_2$ yielding an additional eight measurements of amplitude and eight measurements of phase shift which will be identified as $A_i$ and $P_i$, respectively, where (i=9, . . . ,16). The above defined cycle is repeated as the borehole instrument is conveyed along the borehole. In summary, thirty-two (32) parameters are measured as a function of instrument depth within the borehole.

The processing of measured data can best be visualized by matrix operation wherein the previously defined thirty-two raw amplitude and phase measurements are multiplied by a non-square matrix which transforms these thirty-two measurements into the parameters of interest. The parameters of interest can be varied and can include traditional formation evaluation related parameters such as resistivity and dielectric constant as well as near borehole parameters such as the radial extent of invasion of the formation by drilling fluid and the resistivity of the invaded zone. Furthermore, borehole parameters such as borehole diameter, eccentricity and ellipticity can be quantified as well as the resistivity of the fluid contained within the borehole. The number of parameters of interest is limited to thirty two or less in the preferred embodiment. In an alternate embodiment, the number of parameters of interest can be greater than the number of raw data measurements. This condition yields an underdetermined set of equations requiring that initial estimates be supplied for the number of parameters of interest exceeding the number of raw data measurements. Regression techniques are then used to minimize the discrepancy between tool response predicted by the model and the set of measured raw data. The preferred embodiment employing thirty two measured parameters will be directed toward the measurement of borehole and near borehole parameters. For purposes of illustration, it will be assumed that five borehole or near borehole parameters are to be determined. These will be denoted $B_n$, where n=1, . . . ,5. The matrix operation is written as $$[T] \times [M] = [B] \quad (1)$$

where $$[B] = \begin{bmatrix} B_1 \\ . \\ . \\ . \\ B_5 \end{bmatrix} \quad (2)$$

$$[M] = \begin{bmatrix} A_1 \\ . \\ . \\ . \\ A_{16} \\ P_1 \\ . \\ . \\ . \\ P_{16} \end{bmatrix} \quad (3)$$

and $$[T] = \begin{bmatrix} T_{1,1} & T_{1,2} & \ldots & T_{1,32} \\ . & & & \\ . & & & \\ . & & & \\ T_{5,1} & T_{5,2} & \ldots & T_{5,32} \end{bmatrix} \quad (4)$$

The matrix [T] is a transform which represents a comprehensive model of the borehole instrument response with the borehole, near borehole, and formation conditions being variables. Since the elements $T_{i,j}$ are predicted by the model, the borehole parameters to be determined, $B_n$ (n=1, . . . ,5), can be calculated directly from the measured parameters represented by the matrix [M]. Using the formalism of equation (1), it is essential that the model represented by [T] yield parameters of interest (the "unknowns") as a function of the downhole instrument response (the measured quantities).

Figure 3:
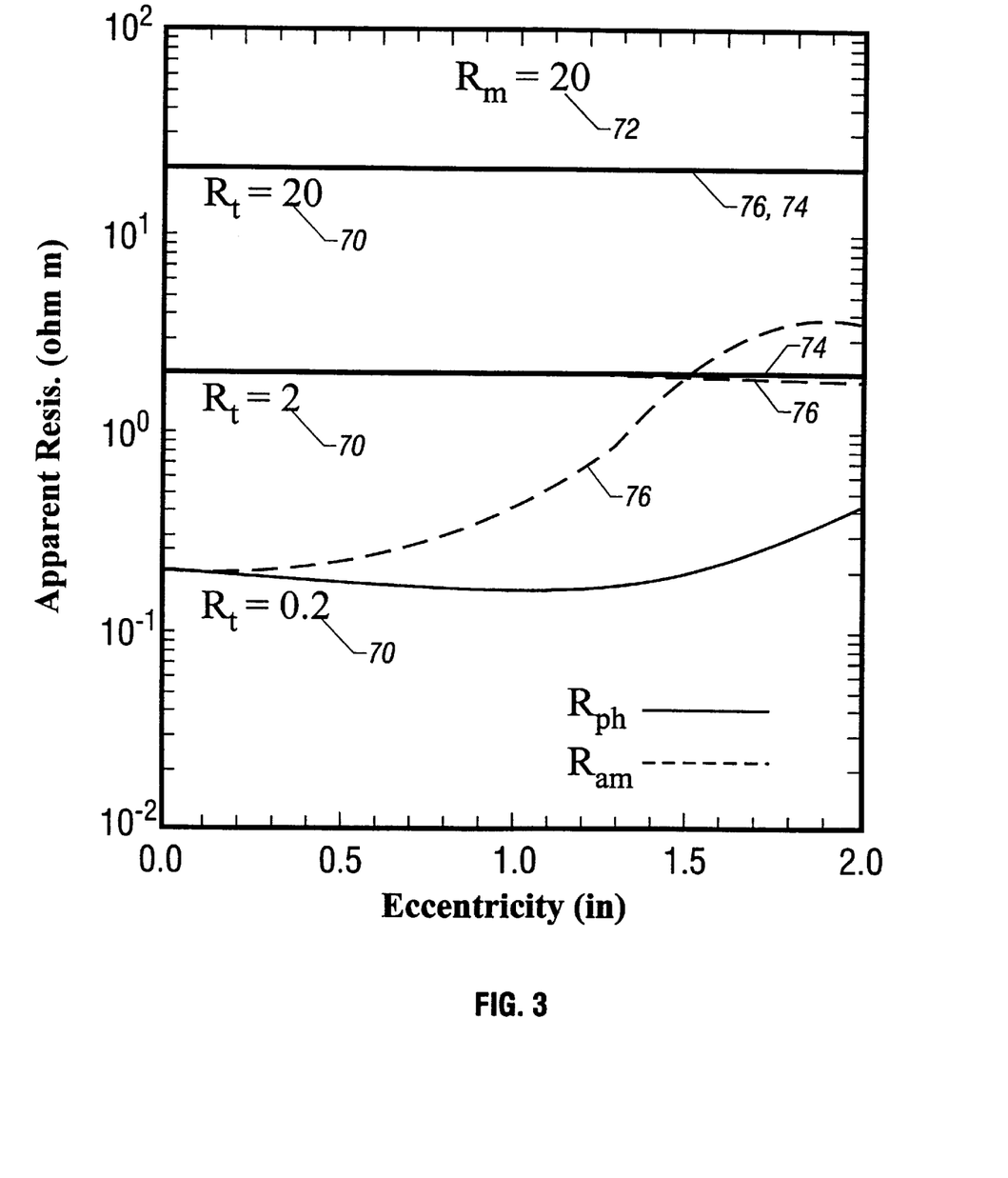
FIG. 3 graphically illustrates the interdependence of apparent phase and amplitude resistivity, true formation resistivity, and borehole eccentricity for a borehole fluid of resistivity of 20 ohm meters.
Figure 4:
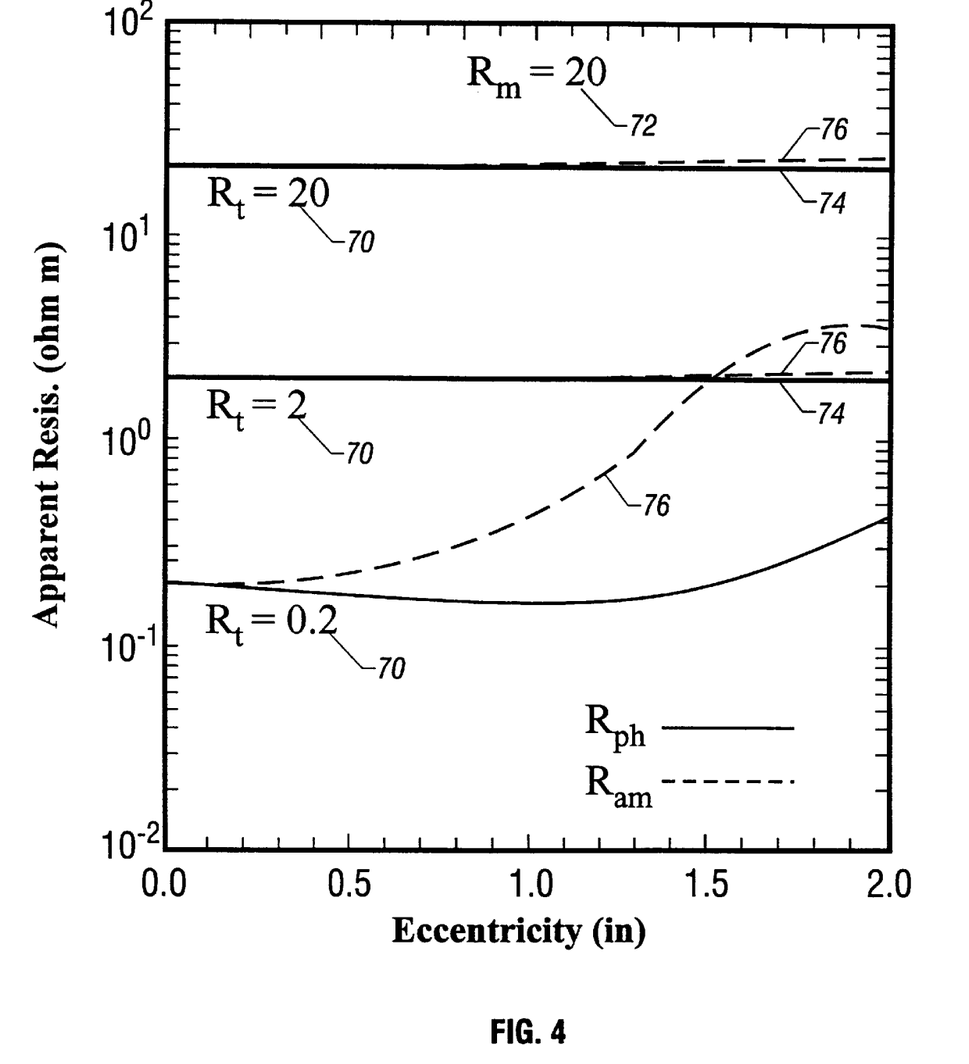
FIG. 4 graphically illustrates the interdependence of apparent phase and amplitude resistivity, true formation resistivity, and borehole eccentricity for a borehole fluid of resistivity of 0.2 ohm meters.

Jian-Qun Wu and Macmillian M. Wisler ("Effects of Eccentering MWD Tool on Electromagnetic Resistivity Measurements", *SPWLA, 31st Annual Logging Symposium*, Jun. 24–27, 1990) disclose a method for calculating the effects of a tool being eccentered in a boreholes upon resistivity measurements and is hereby entered by reference. As an example of this work, FIG. 3 illustrates the variations of measured of apparent phase 74 and amplitude 76 resistivities, respectively, at a given transmitter-receiver spacing, as a function of eccentricity for formation resistivity 70 of 0.2, 2.0 and 20 ohm meters and with a borehole fluid resistivity 72 of 20 ohm meters. The transmitter frequency is 2 MHz. A similar plot is shown in FIG. 4 for a borehole fluid resistivity of 0.2 ohm meters and all other parameters remaining the same. In these examples, functional relationships have been developed which yield apparent resistivity values that will be measured by the borehole instrument (the measured quantities) as a function of formation and borehole resistivities and eccentricity which are the "unknown" quantities to be determined with apparatus and methods of this invention. The responses are computed using a model developed around basic electromagnetic wave propagation principles using borehole geometry. The calculations have been verified experimentally. J.-Q. Wu, M. M. Wisler and J. F. Towle ("Effects of Arbitrarily Shaped Boreholes and Invasion on Propagation Resistivity Measurements in Drilling Horizontal Wells", *Progress in Electromagnetic Research Symposium*, Pasadena, Calif., Jul. 14, 1993) likewise discloses a method for determining the measured response of borehole instruments in terms of circular and non circular invasion profiles and also in terms of instrument eccentricity within the borehole. This publication is incorporated herein by reference. Again measured quantities are expressed in terms of unknown parameters of interest. Stated another way the cited reference discloses a method for calculating the forward problem which if incorporated in the comprehensive model, the current invention would cast the matrix equation (1) in the reverse direction yielding equation (5)

$$[T] \times [B] = [M] \quad (5)$$

where $$[T] = \begin{bmatrix} T_{1,1} & T_{1,2} \ldots & T_{1,5} \\ . & & . \\ . & & . \\ . & & . \\ T_{32,1} & T_{32,2} & T_{32,5} \end{bmatrix} \quad (6)$$

The solution of equation (6) for [B] requires a regression scheme which is in general non-linear. That is, values of the parameters of interest, namely the elements of [B], are iterated until the elements of [M] calculated from equation (6) converge upon the actual measured values $A_i$ and $P_i$ (i=1, . . . ,16). It is again emphasized that the other borehole and near borehole parameters are included in the model. Such additional parameters might include borehole diameter and resistivity of the invaded zones. Those parameters detailed in FIGS. 3 and 4 are presented as examples to illustrate the concepts of the data processing method. The additional characteristics of the response of the downhole instrument, obtained by mathematical modeling, are likewise incorporated as elements of the matrix [T].

The above description may make other alternate embodiments of the invention apparent to those skilled in the art. It is therefore the aim of the appended claims to cover all such changes and modifications as fall within the true spirit and scope of the invention.

What is claimed is:

1. A method for simultaneously determining electromagnetic properties of earth formation penetrated by a borehole and parameters associated with the borehole and near borehole region, comprising:

(a) providing a borehole instrument comprising one or more transmitter-receiver pairs;

(b) operating each transmitter component of said transmitter-receiver pairs at one or more operating frequencies thereby inducing electromagnetic radiation within the formation and borehole environs;

(c) measuring the amplitude and phase of electromagnetic radiation detected by the receiver component of each said transmitter-receiver pair at each said operating frequency, thereby obtaining a set of data parameters comprising an amplitude and a phase measurement for each said transmitter-receiver pair at each said operating frequency;

(d) providing a borehole instrument response model which relates said data parameters to the formation, near borehole and borehole environs;

(e) selecting formation, near borehole and borehole parameters of interest which are to be determined;

(f) computing said parameters of interest by combining said data parameter set with said borehole instrument response model using a predetermined relationship where said computation is performed within said borehole instrument or at the surface of the earth or both;

(g) tracking the depth of said borehole instrument within the borehole;

(h) recording said parameters of interest as a function of depth within the borehole to which they correspond;

(i) conveying said borehole instrument along the borehole; and (j) repeating steps (b) through (h) as said borehole instrument is conveyed along the borehole.

2. The method of claim 1, wherein said number of parameters of interest is greater than the number of elements in said data parameter in which case the parameters of interest exceeding said number of elements in said data parameter set are first estimated and then varied utilizing a regression technique until any discrepancy between the borehole instrument response predicted by said model and said data parameter set is minimized.

3. A method of determining a plurality of parameters of interest utilizing an electromagnetic wave propagation tool conveyed in a borehole, said electromagnetic wave propagation tool containing at least one transmitter adapted to transmit electromagnetic wave energy into the formation surrounding the tool and a plurality of spaced apart receivers for receiving electromagnetic wave energy from the formation responsive to the transmitted electromagnetic wave energy, said method comprising:

(a) activating the at least one transmitter to transmit electromagnetic wave energy into the formation at one or more frequencies;

(b) obtaining a set of raw measurements of amplitude and phase of the electromagnetic wave energy received by each said receiver at each said frequency; and (c) determining from said set of raw measurements a quantitative measure of each said parameter of interest, wherein said plurality of parameters of interest includes an electromagnetic property of the formation and at least one physical property relating to the borehole.

4. The method according to claim 3, wherein the at least one physical property relating to the borehole is borehole eccentricity.

5. The method according to claim 3, wherein the at least one physical property relating to the borehole is rugosity.

6. The method according to claim 3, wherein the at least one physical property relating to the borehole is a characteristic of an invaded zone surrounding the tool.

7. The method according to claim 3, wherein the set of raw measurements contains at least sixteen measurements.

8. The method according to claim 3, wherein the at least one frequency includes two frequencies.

9. The method according to claim 3, wherein the electromagnetic property is apparent resistivity of the formation.

10. The method according to claim 3, wherein the at least one physical property relating to the borehole is borehole elipticity.

11. A method for determining a plurality of parameters of interest during drilling of a borehole by a tool having a plurality of transmitters, each said transmitter adapted to generate electromagnetic propagation waves into the formation surrounding the borehole and a plurality of receivers, each said receiver adapted to detect electromagnetic waves from the formation corresponding to the waves generated by each said transmitter, the method comprising:

(a) operating each said transmitter at one or more frequencies to induce electromagnetic waves into the formation;

(b) measuring electromagnetic waves detected by each said receiver at each said frequency, thereby obtaining a set of raw measurements;

(c) providing a model which relates said raw measurements to the parameters of interest;

(d) selecting the plurality of parameters of interest for which quantitative values are to be determined, at least one such selected parameter of interest being a physical characteristic of the borehole selected from a group consisting of (a) borehole rugosity, (b) elipticity, (c) eccentricity, and (d) a parameter relating to an invaded zone.

12. A method of determining electromagnetic properties of earth formations penetrated by a borehole and parameters associated with the borehole and near borehole region, comprising:

(a) conveying a borehole instrument in the borehole instrument, said instrument comprising a plurality of transmitter-receiver pairs;

(b) operating each transmitter component of said transmitter-receiver pairs at at least one operating frequency, thereby inducing electromagnetic wave energy within the formation and borehole environs;

(c) measuring amplitude and phase of the electromagnetic wave energy detected by the receiver component of each said transmitter-receiver pair at each said operating frequency to obtain a set of raw measurements containing an amplitude and a phase measurement for each said transmitter-receiver pair at each said operating frequency;

(d) defining a response model that relates said raw measurements to the formation and borehole environs;

(e) selecting formation, near borehole and borehole parameters of interest which are to be determined; and (f) computing said parameters of interest by combining said measurements in said set of raw measurements with said response model according to a predetermined relationship.

13. The method of claim 12 wherein said number of parameters of interest exceeds the number of elements in said set of raw measurements and wherein the parameters of interest exceeding said number of elements in said set of measurements are estimated and then varied utilizing a regression technique until any discrepancy between the borehole instrument response predicted by said model and said set of measurements is reduced to a desired value.

14. The method of claim 13, wherein the number of raw measurements is at least sixteen.

15. The method of claim 12 wherein said raw measurement and said parameters of interest are correlated to the borehole depth.

16. The method of claim 12, wherein transmitter elements are operated at two frequencies.

17. The method of claim 12, wherein said parameters of interest include a parameter selected from a group consisting of (a) formation resistivity and (b) formation dielectric constant.

18. The method of claim 17, wherein at least one parameter of interest is selected from a group consisting of (a) borehole invasion profiles, (b) borehole rugosity, (c) borehole elipticity and (d) borehole size.

19. The method of claim 12, wherein said borehole instrument is conveyed along the borehole by apparatus selected from a group consisting of (a) tubing and (b) wireline.

20. The method of claim 12, wherein said borehole instrument response model predicts the response of said borehole instrument as a function of the formation, near borehole and borehole environs and said combining of the raw measurements with the borehole instrument response model comprises:
   (i) selecting n parameters of interest to be determined, where n is equal to or less than the number of raw measurements;
   (ii) formulating the borehole instrument response model in the form of a model matrix;
   (iv) formulating said set of raw measurements in the form of a data matrix;
   (v) formulating said parameters of interest in the form of a parameter matrix;
   (vi) forming a matrix equation by multiplying said model matrix by said parameter matrix to obtain a predicted data matrix which represents the response of said borehole instrument as a nonlinear regression scheme to minimize the discrepancy between said data matrix and said predicted data matrix; and
   (vii) realizing the parameters of interest when convergence of said data matrix and said predicted data matrix occurs.

21. A borehole instrument for determining electromagnetic properties of earth formations penetrated by a borehole and parameters associated with the borehole and near borehole region, comprising:
   (a) an elongated borehole instrument comprising a plurality of transmitter-receiver pairs:
   (b) a power circuit for operating the transmitter component of each said transmitter-receiver pair at at least one operating frequency;
   (c) a circuit for determining a set of raw measurements comprising an amplitude and a phase measurement detected by each said receiver component of each said transmitter-receiver pair at each said frequency;
   (d) a model associated with the borehole instrument that relates the set of raw measurements to electromagnetic properties of earth formations and parameters associated with the borehole and near borehole regions; and
   (e) a processing circuit, said processing circuit combining the set of raw measurements with the model according to a predetermined manner to compute a plurality of parameters of interest that include a parameter that relates to electromagnetic properties of earth formations penetrated by the borehole and parameters associated with the borehole and near borehole regions.

22. The borehole instrument of claim 21 further comprising a memory for storing the parameters of interest as function of the borehole depth to which they correspond.

23. The borehole instrument of claim 21, wherein the number of transmitter-receiver pairs is at least eight.

24. The borehole instrument of 21, wherein the borehole instrument is adapted to be conveyed into the borehole by an apparatus selected from a group consisting of (a) a tubing and (b) wireline.

25. The borehole instrument of claim 21 further comprising a data transmission system for communicating with apparatus at the surface.

26. The apparatus of claim 25 wherein said data transmission system comprises a recorder and memory contained in which the data is stored for subsequent retrieval and processing.

27. The apparatus of claim 25 further comprising recorder and memory means with which said processed data are recorded and stored for subsequent retrieval when said drill is returned to the surface of the earth.

28. A method of determining a plurality of parameters of interest utilizing an electromagnetic wave propagation tool conveyed in a borehole, said electromagnetic tool containing at least one transmitter that transmits electromagnetic wave energy into the formation surrounding the tool and a plurality of spaced apart receivers for detecting the electromagnetic wave energy from the formation that is responsive to the transmitted electromagnetic wave energy, said method comprising:
   (a) activating the at least one transmitter to transmit electromagnetic wave energy into the formation at one or more frequencies
   (b) obtaining a set of raw measurements of amplitude and phase of the electromagnetic wave energy received by each said receiver corresponding to the each said frequency;
   (c) determining from the set of raw measurements apparent resistivity of the formation corresponding to each said measurement in said set of measurements; and
   (d) determining from the raw measurements and the computed apparent resisitivities a quantitative value of at least one physical property of the borehole.

29. The method according to claim 28 further comprising correcting each of the determined apparent resistivity measurements for borehole properties utilizing the computed at least one borehole physical property.

30. The method according to claim 28 further comprising determining utilizing the determined at least one borehole property a mechanical property of the rock matrix of the formation.

31. The method according to claim 28 further comprising determining utilizing the determined at least one borehole property a shallow invasion profile of the formation.

32. The method according to claim 28 further comprising determining a drilling program relating to the drilling of the wellbore by utilizing the borehole.

33. The method according to claim 28 further comprising matching vertical resolution of each of the raw measurements prior to the combining of such measurements.

* * * * *

UNITED STATES PATENT AND TRADEMARK OFFICE
CERTIFICATE OF CORRECTION

PATENT NO : 5,892,361
DATED : April 6, 1999
INVENTOR(S) : Wallace Harold Meyer, Jr. et al.

It is certified that error appears in the above-identified patent and that said Letters Patent are hereby corrected as shown below:

At column 2, line 6, delete "effecting" and insert therefor -- effective --.
At column 3, line 21, delete "receiver" and insert therefor -- transmitter --.
At column 3, line 24, delete "eight" and insert therefor -- sixteen --.
At column 3, line 54, delete "0.2" and insert therefor -- 200 --.
At column 4, line 44, delete "trasmitter" and insert therefor -- transmitter --.
At column 6, line 4, delete "0.2" and insert therefor -- 200 --.
At column 8, lines 35-36, delete "borehole instrument" and insert therefor
 -- borehole --.

Signed and Sealed this

Tenth Day of April, 2001

*Attest:*

NICHOLAS P. GODICI

*Attesting Officer*   Acting Director of the United States Patent and Trademark Office

UNITED STATES PATENT AND TRADEMARK OFFICE
CERTIFICATE OF CORRECTION

PATENT NO : 5,892,361
DATED : April 6, 1999
INVENTOR(S) : Wallace Harold Meyer, Jr. et al.

It is certified that error appears in the above-identified patent and that said Letters Patent are hereby corrected as shown below:

FIG. 4